(12) United States Patent
Lombana

(10) Patent No.: US 6,981,995 B2
(45) Date of Patent: Jan. 3, 2006

(54) SEPARATOR FOR FLUIDS AND SOLIDS

(76) Inventor: Jorge L. Lombana, 11000 SW. 47th St., Miami, FL (US) 33165

( * ) Notice: Subject to any disclaimer, the term of this patent is extended or adjusted under 35 U.S.C. 154(b) by 0 days.

(21) Appl. No.: 10/785,335

(22) Filed: Feb. 25, 2004

(65) Prior Publication Data

US 2004/0163369 A1    Aug. 26, 2004

Related U.S. Application Data

(63) Continuation-in-part of application No. 09/865,994, filed on May 25, 2001, now abandoned.

(51) Int. Cl.
*B01D 45/16*     (2006.01)

(52) U.S. Cl. ............................ 55/452; 55/461; 96/216
(58) Field of Classification Search ................. 96/208, 96/212, 216, 195; 55/461, 452, 455, 456, 55/457; 95/269, 261
See application file for complete search history.

(56) References Cited

U.S. PATENT DOCUMENTS

| | | | | |
|---|---|---|---|---|
| 1,306,003 A | * | 6/1919 | Good ........................... | 95/269 |
| 1,387,748 A | * | 8/1921 | Wilson ......................... | 96/158 |
| 1,799,684 A | * | 4/1931 | Gilbert et al. ............... | 417/185 |
| 1,958,577 A | * | 5/1934 | Hirshfeld ...................... | 55/355 |
| 2,015,076 A | * | 9/1935 | Lavigne ........................ | 55/461 |
| 2,049,578 A | * | 8/1936 | Werts ........................... | 96/159 |
| 2,193,460 A | * | 3/1940 | Lavigne ........................ | 95/269 |
| 3,139,331 A | * | 6/1964 | Boudreau ..................... | 96/319 |
| 3,352,090 A | * | 11/1967 | Stillebroer .................... | 96/208 |
| 4,278,550 A | * | 7/1981 | Watts ........................... | 210/741 |
| 5,567,321 A | * | 10/1996 | Weber et al. ................. | 210/376 |

* cited by examiner

Primary Examiner—Frank M. Lawrence
(74) Attorney, Agent, or Firm—Jesus Sanchelima; Albert Bordas

(57) ABSTRACT

A separator device for separating heavier small particles, solids and liquids, in suspension in a fluid that are forced through a wound conduit member with a plurality of through openings on the outermost wall portion. The fluid is forced by a pressure differential between the inlet and the outlet. That causes said fluid to achieve a predetermined speed inside the conduit member. A housing covering the conduit member collects and/or contains the heavier matter that exits the through openings by the effect of centrifugal forces acting thereon. The centrifugal force generated will be proportional to the speed square and inversely proportional to the radius of curvature. Inwardly extending walls trap or force small particles outwardly through the through openings. Also, outwardly extending walls prevent the small particles and/or water in suspension from re-entering the conduit member.

6 Claims, 1 Drawing Sheet

SEPARATOR FOR FLUIDS AND SOLIDS

OTHER RELATED APPLICATIONS

The present application is a continuation-in-part of abandoned U.S. patent application Ser. No. 09/865,994, filed on May 25, 2001, which is hereby incorporated by reference.

BACKGROUND OF THE INVENTION

1. Field of the Invention.

The present invention relates to a separator for fluids and solids, and more particularly, to a separator that does not use moving parts.

2. Description of the Related Art

Many designs for treating gases have been designed in the past for the purpose of separating a particular gas from solids or liquids suspended in a physical mixture. The prior art devices use moving parts to avail themselves of the effect of centrifugal forces. Nor are the prior art devices suitable to be used in a continuous system. None of these designs have achieved the degree of success realized in the present invention with a relatively simple structure that is inexpensive to construct and maintain.

Applicant believes that the closest reference corresponds to U.S. Pat. No. 2,015,076 issued to Lavigne for a centrifugal separator. However, it differs from the present invention because Lavigne patented invention does not include through openings cooperatively disposed at an angle to facilitate the exit of the solids by defining an entrance adjacent to the outermost wall portion of the conduit member.

Applicant believes that another of the closest references correspond to U.S. Pat. No. 4,278,550 issued to Watts for a fluid separator. However, it differs from the present invention because Watts patented invention does not include through openings cooperatively disposed at an angle to facilitate the exit of liquid by defining an entrance adjacent to the conduit's outermost wall portion. The present invention is characterized by having openings at acute (downstream) angle with respect to the direction of flow of the fluid inside the serpentine that facilitate the exit of solids and liquids, respectively. In Watts the openings run at an acute (upstream) angle with respect to the direction of flow of the fluid (FIG. 3). The most that the particles can do in Watts is clog the entrance to the openings. Therefore, Watts' device is inoperable to separate particles in a fluid. In the present invention, the inwardly extending portion directs the particle towards the opening.

Another of the closest prior arts know to Applicant corresponds to U.S. Pat. No. 5,567,321 issued on Oct. 22, 1996 to Weber, Rohr and Suter. The centrifugal filter discloses a rotatable traveling basket including holes and a rather complicated mechanism. However, the patented centrifugal filter uses moving parts and it would not work in a continuous system. Also, it does not work for gases such as those present in exhaust systems.

SUMMARY OF THE INVENTION

It is one of the main objects of the present invention to provide a separator for fluids and solids that does not use moving parts.

It is another object of this invention to provide a separator for fluids and solids that is easy to install and use, especially with internal combustion engines.

It is still another object of the present invention to provide a separator that does not require power or any source of energy other than the pressure applied by the fluid being processed.

It is yet another object of the present invention to provide a separator that can be used in a continuous system.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
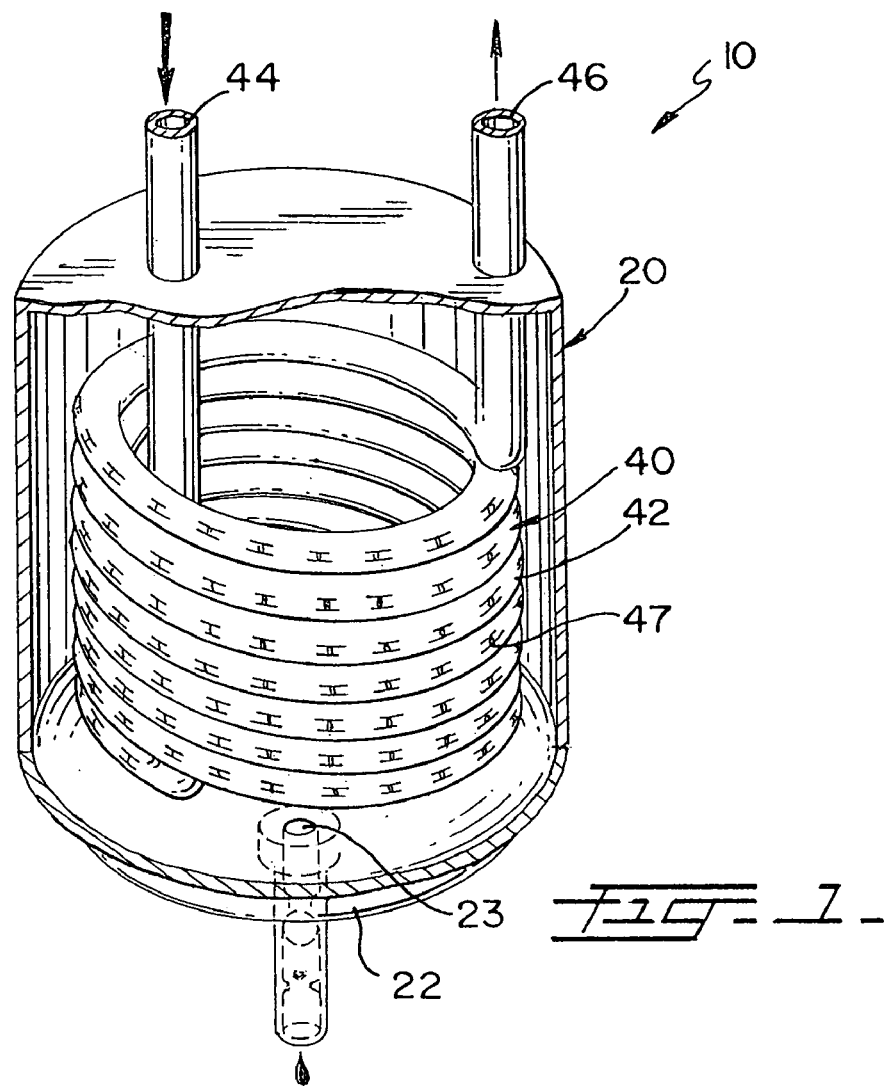
FIG. 1 represents an isometric view of one of the embodiments with a broken portion showing the interior of its housing for the separator object of the present invention.

Referring now to the drawings, where the present invention is generally referred to with numeral 10, it can be observed that it basically includes housing 20, wound conduit assembly 40, inlet 44 and outlet 46. In operation, a fluid to be processed (typically containing small particles or vaporized liquids in suspension) enters inlet 44 and exits through outlet 46. One of the advantages of this invention is that it lends itself to be used in a continuous system, such as for treating the exhaust gases produced by an internal combustion engine.

As seen in FIG. 1, housing 20 has a substantial cylindrical shape with a concave bottom 22 including an opening 23 in its lowermost point. Wound conduit assembly 40 is mounted inside housing 20.

Figure 2:
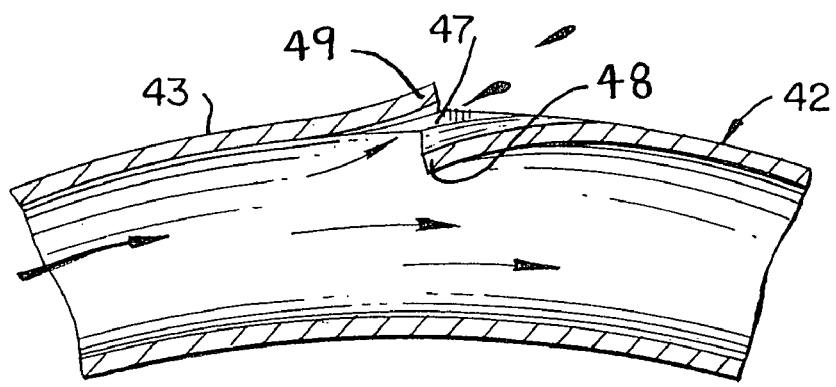
FIG. 2 shows a cross-sectional view of a wounded conduit's portion, showing the disposition of the through openings.

Wound conduit assembly 40 includes a serpentine conduit member 42 with outermost wall portion 43. Serpentine conduit member includes inlet 44 and outlet 46. Outermost wall portion 43 has a plurality of through openings 47. In the preferred embodiment, openings 47 are formed at an angle to facilitate the exit of the heavier matter contained in the gas mixture, as best seen in FIG. 2. Inwardly extending wall 48 that directs particles outwardly, by the centrifugal force, to enter opening 47. Inwardly extending wall 48 extends at an angle that extends from 15 to 45 degrees with respect to the internal surface of conduit assembly 40. Wall 48 is positioned adjacent and downstream from openings 47. In this manner, fluid or solid particles will be trapped and forced out through openings 47 by the centrifugal force. Once outside, gravity causes it to fall within housing 20 wherein it is collected.

The small particles and/or liquid in suspension form a circular current inside housing 20 after they exit assembly 40. To prevent the small particles or separated liquid in suspension to reenter assembly 40, outwardly extending wall 49 is disposed adjacent and upstream from through openings 47, at an angle between 15 and 45 degrees with respect to the outermost wall portion 43.

The present invention can be implemented with different means for applying a pressure differential between inlet 44 and outlet 46 so that the fluid entering inlet 44 is forced through serpentine conduit member 42 and out through outlet 46. The heavier matter contained in the fluid is forced radially out through openings 47 by the action of the centrifugal forces. In this manner, the resultant fluid that exits through outlet 46 is free of the heavier particles and/or liquids. The pressure differential can be enhanced with the application of a pressurized second fluid (such as air) through inlet 44 that causes the fluid being processed to speed up through member 42.

The centrifugal force acting on the solids or heavier mater suspended in the fluid is represented with the following equation F $V^2$/R where V is the velocity of the fluid and suspended heavier matter and R is the radius of curvature.

In the embodiment shown in FIG. 1, the heavier matter passing through openings 47 is collected at bottom 22 passed through 23 for disposal or further processing.

One of the applications for the present invention is with internal combustion engines. The exhaust gases typically contain particles and oil vapors in suspension. Other industrial applications make also desirable separating solids/liquids from fluids (liquids or gases), such as environmental, pollution control devices and others. Forcing the exhaust gases through serpentine conduit member 42 causes a centrifugal force that is proportional to the square of the to rotational speed at which the exhaust gases are traveling. The higher the pressure differential with respect to outlet 46, the faster the gases will travel and the higher the magnitude of the centrifugal force. Also, the larger the radius of curvature of the wound conduit members, the smaller the centrifugal force.

Applicant has found that using a coil of 6.4 cm. in diameter for the wound conduit member and with a conduit member having an inner diameter of 1 cm., the pressure provided by typical internal combustion engines has been sufficient to impart the necessary speed to the fluid for the present invention to work.

Another application would be the use of the invention in polluted areas such as industrial smokestacks. In these applications, the polluted air can be compressed and injected to inlet 44 or alternatively a negative pressure is applied to outlet 46 to suck the polluted air.

One other possible application contemplates the use of the invention with pressurized gases, such as air, to separate water vapors and other particles.

Still another application involves a liquid fluid, such as oil, with small solids in suspension. The oil can be engine in transmission oil, for instance. The liquid is forced through inlet 44 in a similar fashion as discussed above.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A separator device, comprising:
   A) a wound conduit member having an internal surface and an outermost wall portion and including an inlet and an outlet, and said outermost wall portion including a plurality of through openings with an inwardly extending wall cooperatively disposed adjacent and downstream to said through openings at an angle to facilitate the exit of solids by defining an entrance adjacent to said outermost wall portion, said outermost wall portion includes outwardly extending walls for each of said through openings cooperatively disposed adjacent and upstream to said through openings to prevent said small particles from coming back inside said conduct member, said outwardly extending walls are cooperatively disposed at an angle to facilitate the exit of said liquid by defining an entrance adjacent to said outermost wall portion;
   B) means for applying a pressure differential between said inlet and outlet so that a fluid having small particles in suspension entering said inlet is forced through said wound conduit member and out through said outlet causing said small particles to be forced out through said though openings by the action of centrifugal forces; and
   C) housing means wherein said wound conduit member is mounted therein thereby containing said small particles.

2. The device set forth in claim 1 wherein said inwardly extending wall is positioned at an angle between 15 and 45 degrees with respect to said internal surface.

3. The device set forth in claim 2 wherein said outwardly extending wall is positioned at an angle between 15 and 45 degrees with respect to said outermost wall portion.

4. A separator device, comprising:
   A) a wound conduit member having an outermost wall portion and including an inlet and an outlet and said outermost wall portion including a plurality of through openings with an inwardly extending wall cooperatively disposed at an angle to facilitate the exit of liquid by defining an entrance adjacent to said outermost wall portion, said outermost wall portion includes outwardly extending walls for each of said through openings cooperatively disposed adjacent and upstream to said through openings to prevent said small particles from coming back inside said conduct member, said outwardly extending walls are cooperatively disposed at an angle to facilitate the exit of said liquid by defining an entrance adjacent to said outermost wall portion;
   B) means for applying a pressure differential between said inlet and outlet so that a fluid having liquids in suspension entering said inlet is forced through said wound conduit member and out through said outlet causing said liquid to be forced out through said through openings by the action of centrifugal forces; and
   C) housing means wherein said wound conduct member is mounted therein thereby containing said liquid as it exits said conduit member.

5. The device set forth in claim 4 wherein said inwardly extending wall is positioned at an angle between 15 and 45 degrees with respect to said internal surface.

6. The device set forth in claim 5 wherein said outwardly extending wall is positioned at an angle between 15 and 45 degrees with respect to said outermost wall portion.

* * * * *